United States Patent
Dave et al.

(10) Patent No.: US 12,085,929 B2
(45) Date of Patent: Sep. 10, 2024

(54) MACHINE LEARNING BASED DIRECT METHOD OF DETERMINING STATUS OF FACILITY CONTROL LOOP COMPONENTS

(71) Applicant: Honeywell International Inc., Morris Plains, NJ (US)

(72) Inventors: Sanjay Kantilal Dave, Bengaluru (IN); Akanksha Jain, Bhopal (IN); Viraj Srivastava, New Delhi (IN); Vijoy Akavalappil, Thrissur (IN)

(73) Assignee: Honeywell International Inc., Charlotte, NC (US)

( * ) Notice: Subject to any disclaimer, the term of this patent is extended or adjusted under 35 U.S.C. 154(b) by 218 days.

(21) Appl. No.: 17/361,990

(22) Filed: Jun. 29, 2021

(65) Prior Publication Data

US 2021/0405631 A1 Dec. 30, 2021

Related U.S. Application Data

(60) Provisional application No. 63/045,751, filed on Jun. 29, 2020.

(51) Int. Cl.
*G05B 23/02* (2006.01)
*G06N 3/049* (2023.01)
*G06N 3/08* (2023.01)

(52) U.S. Cl.
CPC ....... *G05B 23/024* (2013.01); *G05B 23/0272* (2013.01); *G06N 3/049* (2013.01); *G06N 3/08* (2013.01)

(58) Field of Classification Search
CPC .. G05B 23/024; G05B 23/0272; G06N 3/049; G06N 3/08; G06N 3/045; G06N 3/048
See application file for complete search history.

(56) References Cited

U.S. PATENT DOCUMENTS

| 5,586,221 A | 12/1996 | Isik et al. |
| 2017/0083830 A1 | 3/2017 | Bates et al. |
| 2019/0188584 A1 | 6/2019 | Rao et al. |
| 2019/0197236 A1 | 6/2019 | Niculescu-Mizil et al. |

(Continued)

FOREIGN PATENT DOCUMENTS

| JP | 2018112852 | 7/2018 |
| KR | 20200009077 | 1/2020 |

(Continued)

OTHER PUBLICATIONS

Zhao et al. "Learning to Monitor Machine Health with Convolution Bi-Directional LSTM Networks", MDPI, Sensors 2017 (Year: 2017).*

(Continued)

*Primary Examiner* — Carlos R Ortiz Rodriguez
(74) *Attorney, Agent, or Firm* — Alston & Bird LLP

(57) ABSTRACT

A trained machine learning algorithm processes time series production data. The time series production data are representative of a control process within a facility control loop. The machine learning training algorithm is trained using positive training data that are representative of a normal operation of components within the facility control loop and negative training data that are representative of an abnormal operation of components within the facility control loop. Output of the trained machine learning algorithm identifies abnormalities in the facility control loop.

20 Claims, 7 Drawing Sheets

(56) References Cited

U.S. PATENT DOCUMENTS

| | | |
|---|---|---|
| 2020/0151440 A1 | 5/2020 | Wang et al. |
| 2020/0183769 A1 | 6/2020 | Poghosyan et al. |
| 2020/0264595 A1 | 8/2020 | Shibata et al. |

FOREIGN PATENT DOCUMENTS

| | | |
|---|---|---|
| WO | 2019/162648 A1 | 8/2019 |
| WO | 2022006077 | 1/2022 |

OTHER PUBLICATIONS

Li, Xiao-Li, et al. "Positive unlabeled learning for data stream classification." Proceedings of the 2009 SIAM international conference on data mining. Society for Industrial and Applied Mathematics, (Year: 2009).*

"International Application Serial No. PCT US2021 039566, International Search Report mailed Oct. 25, 2021", 3 pgs.

"International Application Serial No. PCT US2021 039566, Written Opinion mailed Oct. 25, 2021", 5 pgs.

Amiruddin, A. A. A. Mohd, et al., "Valve stiction detection through improved pattern recognition using neural networks", Control Eng. Pract., 90, (2019), 63-84.

Choudhury, M.A.A. Skoukat, et al., "Diagnosis of poor control loop performance using higher order statistics", Automatica, 40(10), (2004), 1719-1728.

Choudhury, M.A.A. Skoukat, et al., "Modelling valve stiction", Control Eng Pract, 13(5), (2005), 641-658.

He, Q. Peter, et al., "A curve fitting method for detecting valve stiction in oscillating control loops", Ind. Eng. Chem. Res., 46(13), (2007), 4549-4560.

Horch, Alexander, et al., "A simple method for detection of stiction in control valves", Control Eng. Pract. 7(10), (1999), 1221-1231.

Jelali, Mohieddine, et al., "Estimation of valve stiction in control loops using separable least-squares and global search algorithms", J Proc Control, 18(7-8), (2008), 632-642.

Kano, Manabu, et al., "Practical model and detection algorithm for valve stiction", IFAC Proceedings Volumes, 37(9), IFAC Symposium on DYCOPS, Cambridge, MA, (2004), 859-864.

Rossi, M., et al., "A comparison of techniques for automatic detection of stiction: simulation and application to industrial data", J. Process Control 15(5), (2005), 505-514.

Scali, Claudio, et al., "An improved qualitative shape analysis technique for automatic detection of valve stiction inflow control loops", Control Eng. Pract., 16(12), (2008), 1501-1508.

Srinivasan, Ranganathan, et al., "Control loop performance assessment. 1. A qualitative approach for stiction diagnosis", Ind. Eng. Chem. Res., 44, (2005), 6708-6718.

Thornhill, Nina F., et al., "Finding the source of nonlinearity in a process with plant-wide oscillation", IEEE Trans. Control Syst. Technol., 13, (2005), 434-443.

Yamashita, Yoshiyuki, et al., "An automatic method for detection of valve stiction in process control loops", Control Eng. Pract., 14(5), (2006), 503-510.

Zabiri, H., et al., "NLPCA as a diagnostic tool for control valve stiction", Journal of Process Control, 19, (2009), 1368-1376.

SA Office Action Mailed on Oct. 19, 2023 for SA Application No. 522441946, 20 page(s).

B. Kamaruddin et al., "A simple model-free butterfly shape-based detection (BSD) method integrated with deep learning CNN for valve stiction detection and quantification," Journal of Process Control, 87:1-16, (Jan. 21, 2020).

Extended European Search Report Mailed on Jun. 25, 2024 for EP Application No. 21834007, 9 page(s).

SA Notice of Allowance Mailed on Jul. 9, 2024 for SA Application No. 522441946, 2 page(s).

* cited by examiner

MACHINE LEARNING BASED DIRECT METHOD OF DETERMINING STATUS OF FACILITY CONTROL LOOP COMPONENTS

RELATED APPLICATIONS

The present application claims priority to U.S. application Ser. No. 63/045,751, the content of which is incorporated herein by reference in its entirety.

TECHNICAL FIELD

The present disclosure relates to a machine learning based direct method of determining the status of facility control loop components, and in an embodiment, but not by way of limitation, a convolutional neural network (CNN) based direct method of determining the status of industrial control loop components.

BACKGROUND

Control valves are increasingly recognized as important capital assets in any facility, such as an industrial plant. Because of their importance, these control valves should be routinely monitored and maintained. Properly maintained control valves help to reduce process variability and improve product quality, which in turn increases the overall efficiency of a plant or other facility. Despite such monitoring and maintenance, control valves can suffer from poor control performance due to valve non-linearities. Such non-linearities include stiction, hysteresis, dead band, and dead zone. These non-linearities in control loops cause oscillations which lead to product quality variation, accelerated equipment wear, and control-system instability.

Out of the several valve non-linearities, valve stiction is of particular concern in many instances. Valve stiction is a condition in which the valve stem resists movement or fails to give a response to an output signal from the controller. Stiction is a particular problem in spring-diaphragm actuated control valves, which are ubiquitous in process industries (e.g., refineries). The main factors that contribute to the presence of stiction are corrosion, lubricant depletion, foreign matter intrusion, activation at metal sliding surfaces at high temperatures, tight packing around the valve stem, and/or chemical reactions between the metal of the valve and the lubricant.

In an industrial processing plant, a control engineer generally analyzes a time series plot of PV (Process Value)-SP (Set Point)-OP (Controller Output) data and identifies valve stiction based on the typical shape pattern of the PV/SP/OP plot. An example of a PV/SP/OP plot in which there is no valve stiction is illustrated in FIG. 1A. An example of a PV/SP/OP plot in which there is stiction is illustrated in FIG. 1B. The typical stiction pattern in FIG. 1B is indicated at 110.

FIC. 1B illustrates an example of a PV/SP/OP plot in which there is valve stiction.

Figure 2:
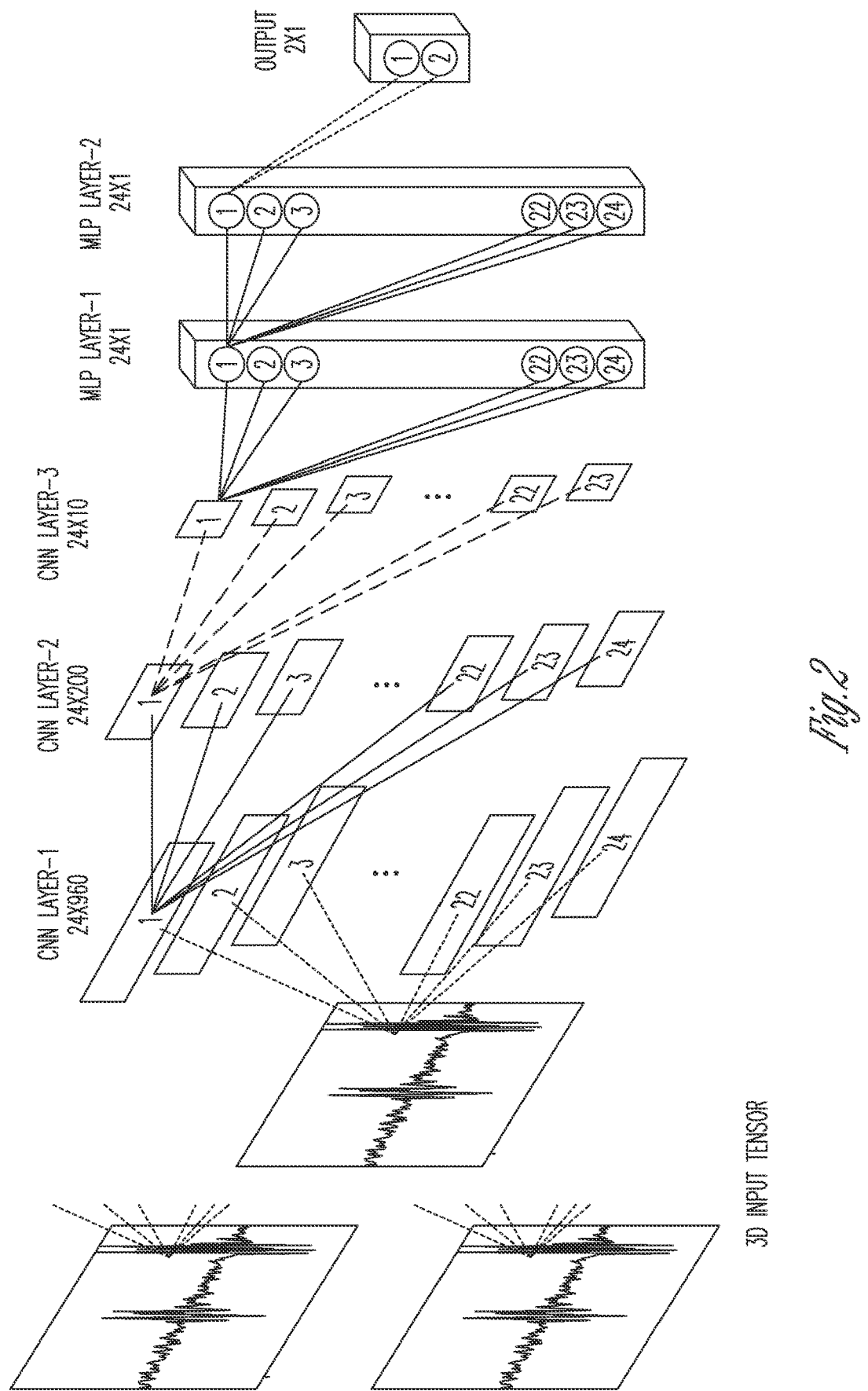

FIG. 2 illustrates an example architecture of a convolutional neural network (CNN).

Figure 3:
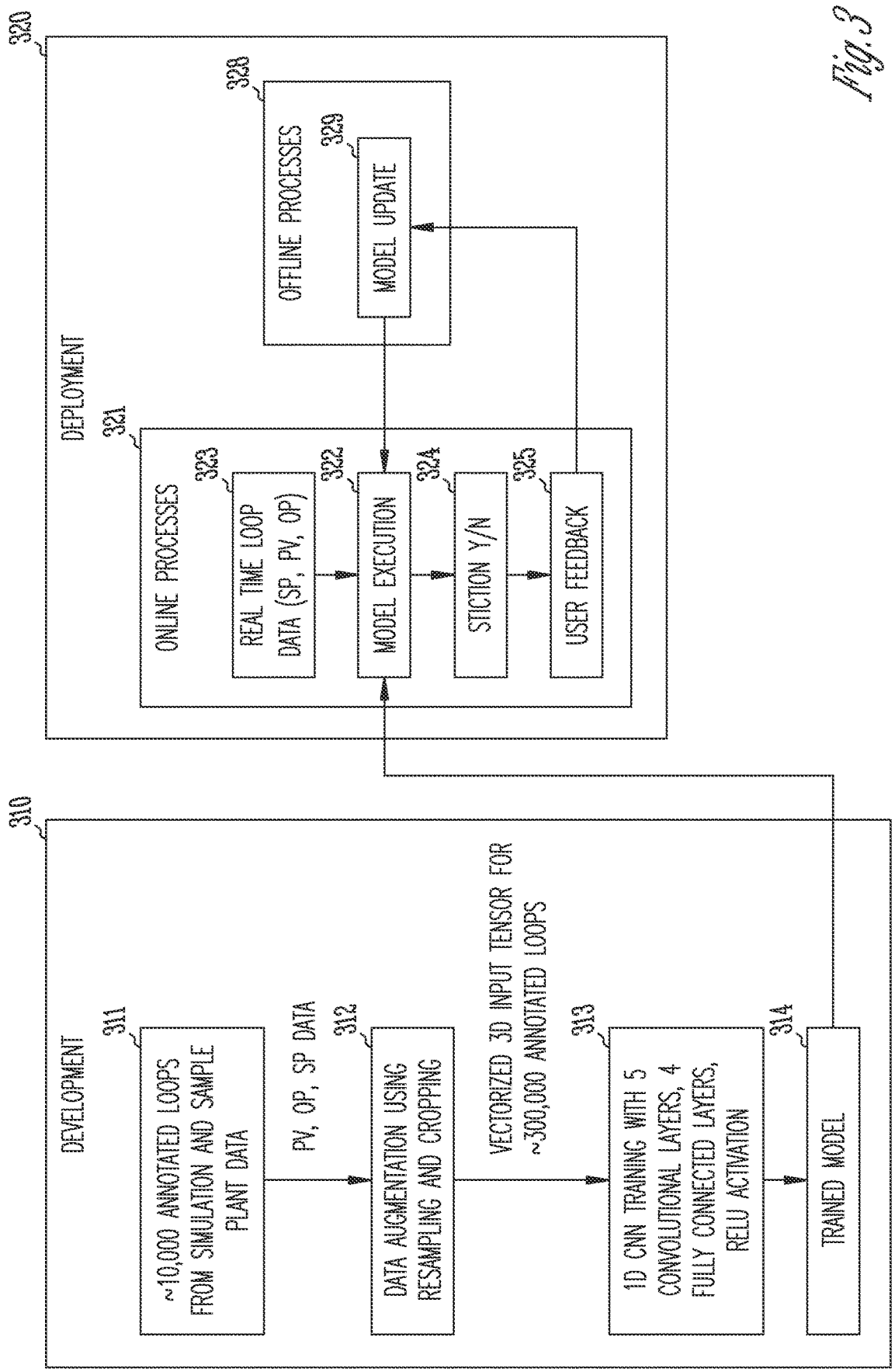

FIG. 3 is a flow chart of an example embodiment to train a machine learning algorithm to detect abnormalities in a facility.

Figure 4A:
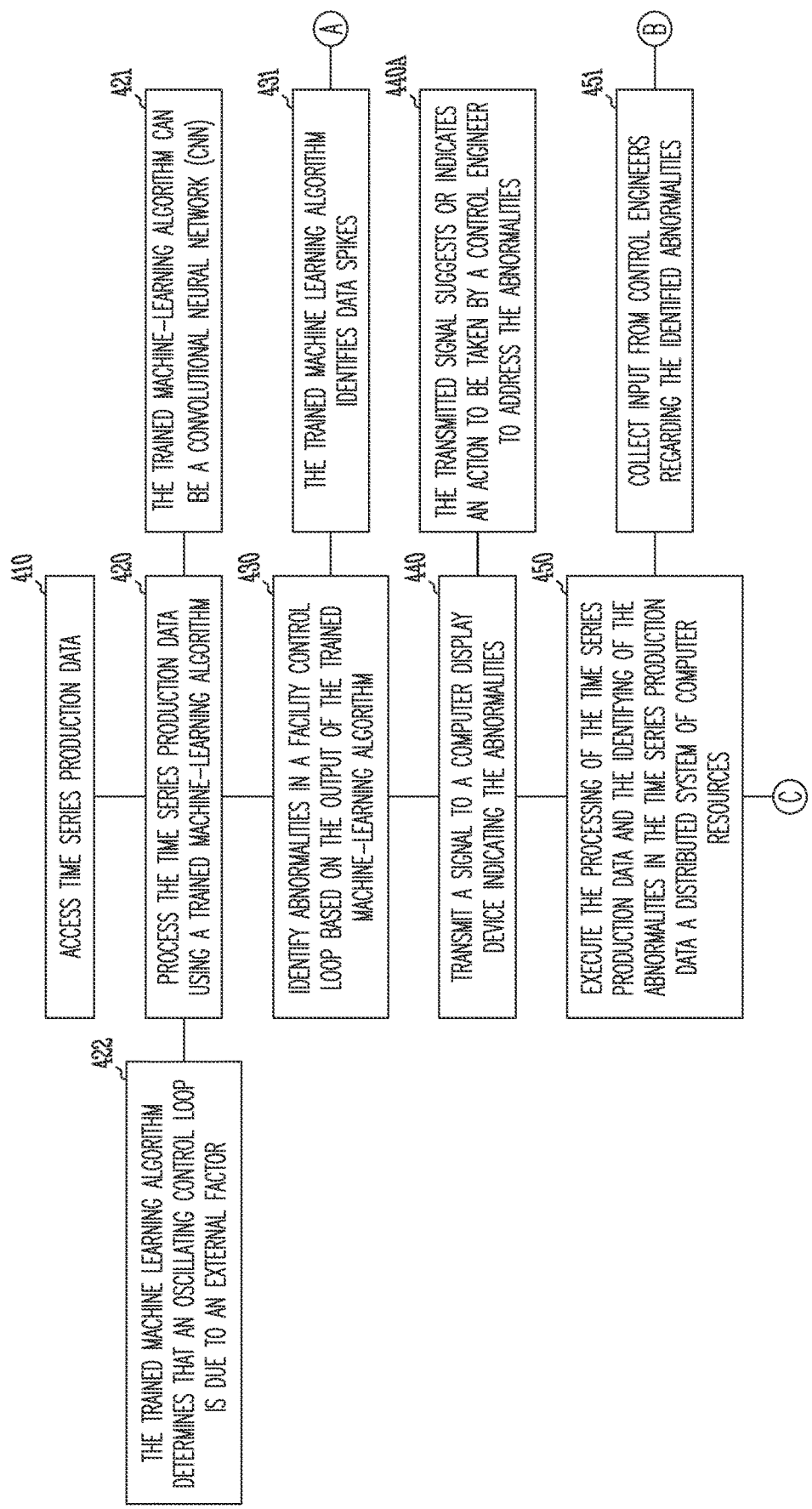
Figure 4B:
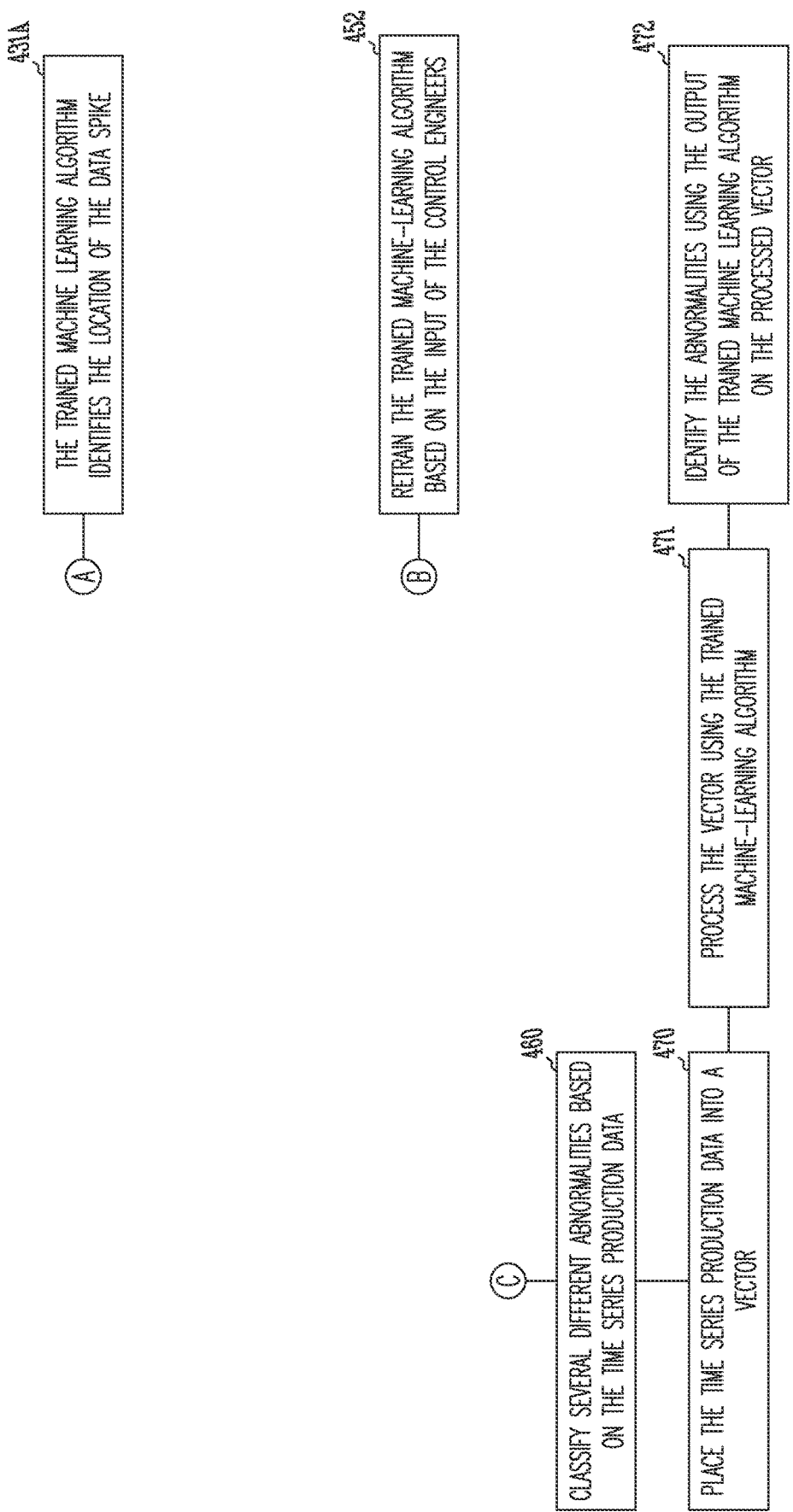

FIGS. 4A and 4B are a flowchart of another embodiment to train a machine learning algorithm to detect abnormalities in a facility.

Figure 5:
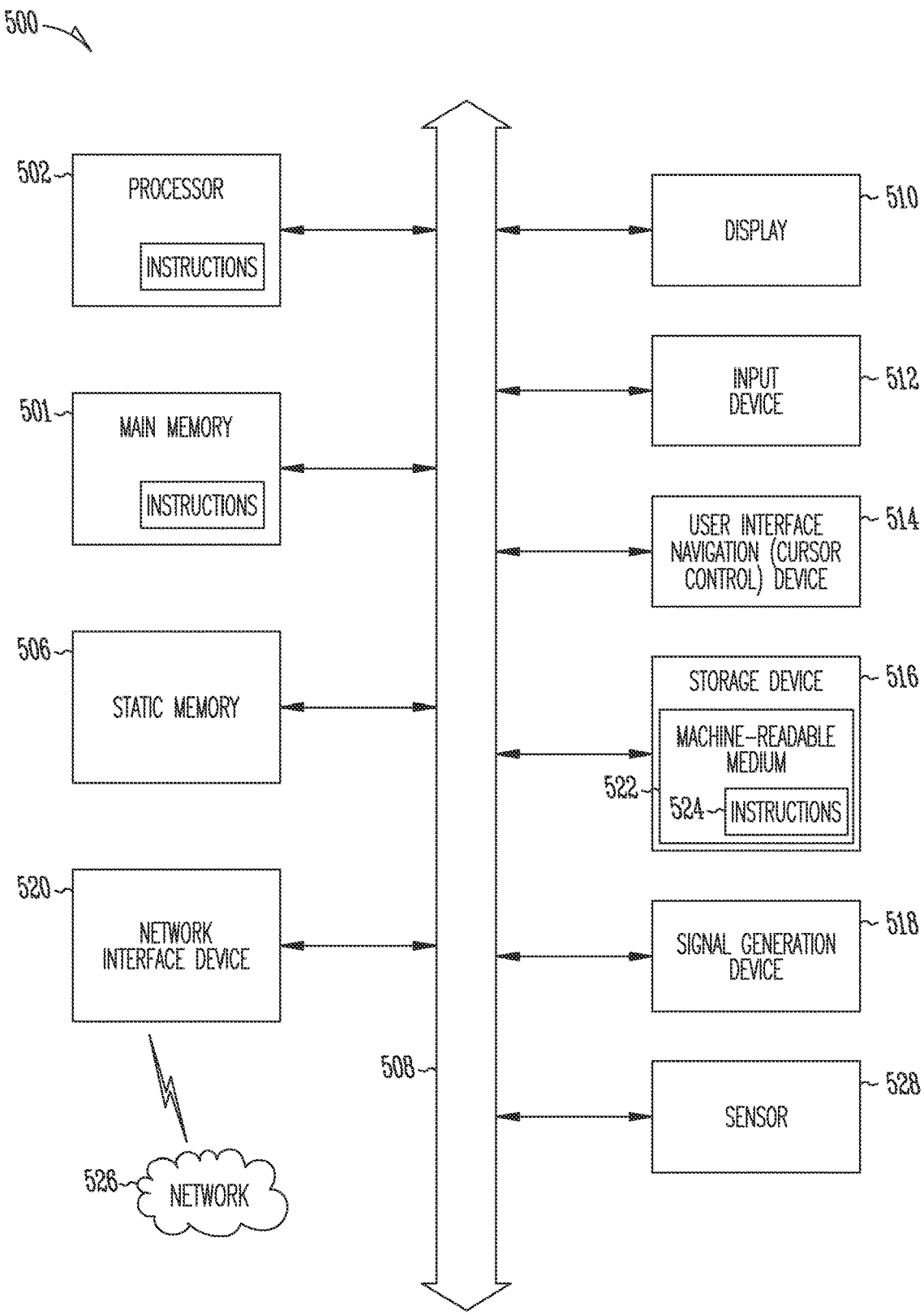

FIG. 5 is block diagram of a computer system upon which one or more embodiments of the present disclosure can execute.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

One or more embodiments relate to a machine learning based method to program and improve upon the intelligence of a control operator of an industrial plant or other facility. This intelligence is grounded in a visual inspection of control loop trends. In an embodiment, the machine learning involves a convolutional neural network (CNN) that creates dynamic models. The method can be used to detect process control abnormalities such as valve stiction and other control loop oscillations. A CNN can be trained to the same level as a group of trained control engineers to detect abnormalities in industrial control loops. The CNN can be self-improved in a cloud-based solution by automatically retraining the model using feedback from the control engineers.

As known to those in the art, convolutional networks are neural networks that use convolution in place of general matrix multiplication in at least one of their layers. A CNN is widely used in image and video recognition, image classification, medical image analysis, and natural language processing. CNNs are adept at copying human intelligence for image processing and are therefore a very strong and proven methodology for identifying and interpreting images. A typical architecture of a CNN is given in FIG. 2, which illustrates a CNN consisting of three convolutional layers, two multilayer perceptrons, and an output layer.

Convolutional neural network based learning techniques provide the ability to learn and tolerate noise in data, can be applied in non-linear systems, and provide a data-based solution where the behavior of a system is either unknown or complex. In an embodiment, the CNN is used to process time series facility production data. Specifically, the use of a CNN-based learning techniques to detect valve stiction and other non-linearities in a facility control loop advances the art in terms of prediction accuracy and computational time. An embodiment can therefore achieve the same level of accuracy, or even exceed that level, of a human control engineer in detecting valve stiction and other abnormalities.

Figure 1A:
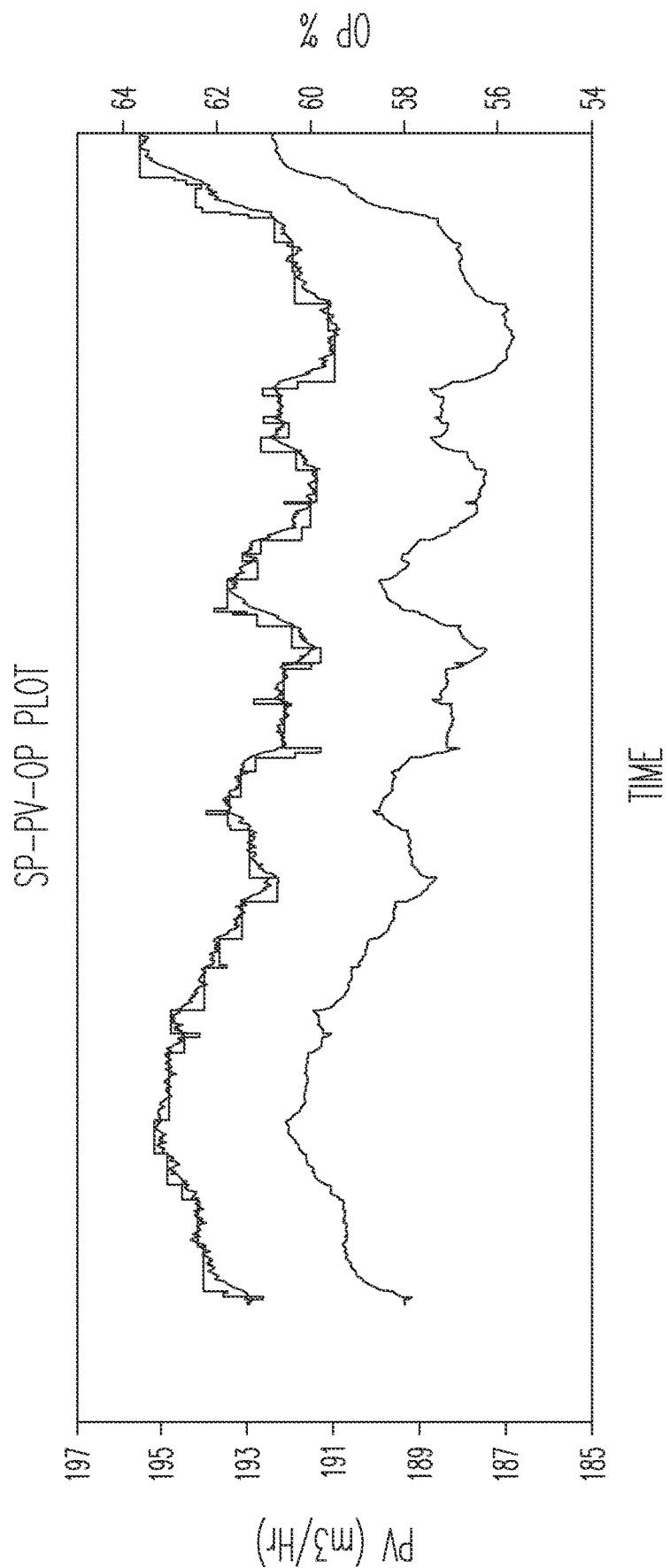
FIG. 1A illustrates an example of a PV/SP/OP plot in which there is no valve stiction.

In connection with machine learning, an embodiment uses shape pattern matching of time series production data to detect the facility abnormalities, such as valve stiction in an industrial plant. In an industrial plant, a control engineer generally analyzes the time series plot of PV (Process Value)-SP (Set Point)-OP (Controller Output) data and identifies stiction based on the typical shape pattern of the PV/SP/OP plot. See FIGS. 1A and 1B. An embodiment trains a machine learning algorithm to use a shape pattern methodology as used by the control engineer to identify the abnormalities.

Figure 1B:
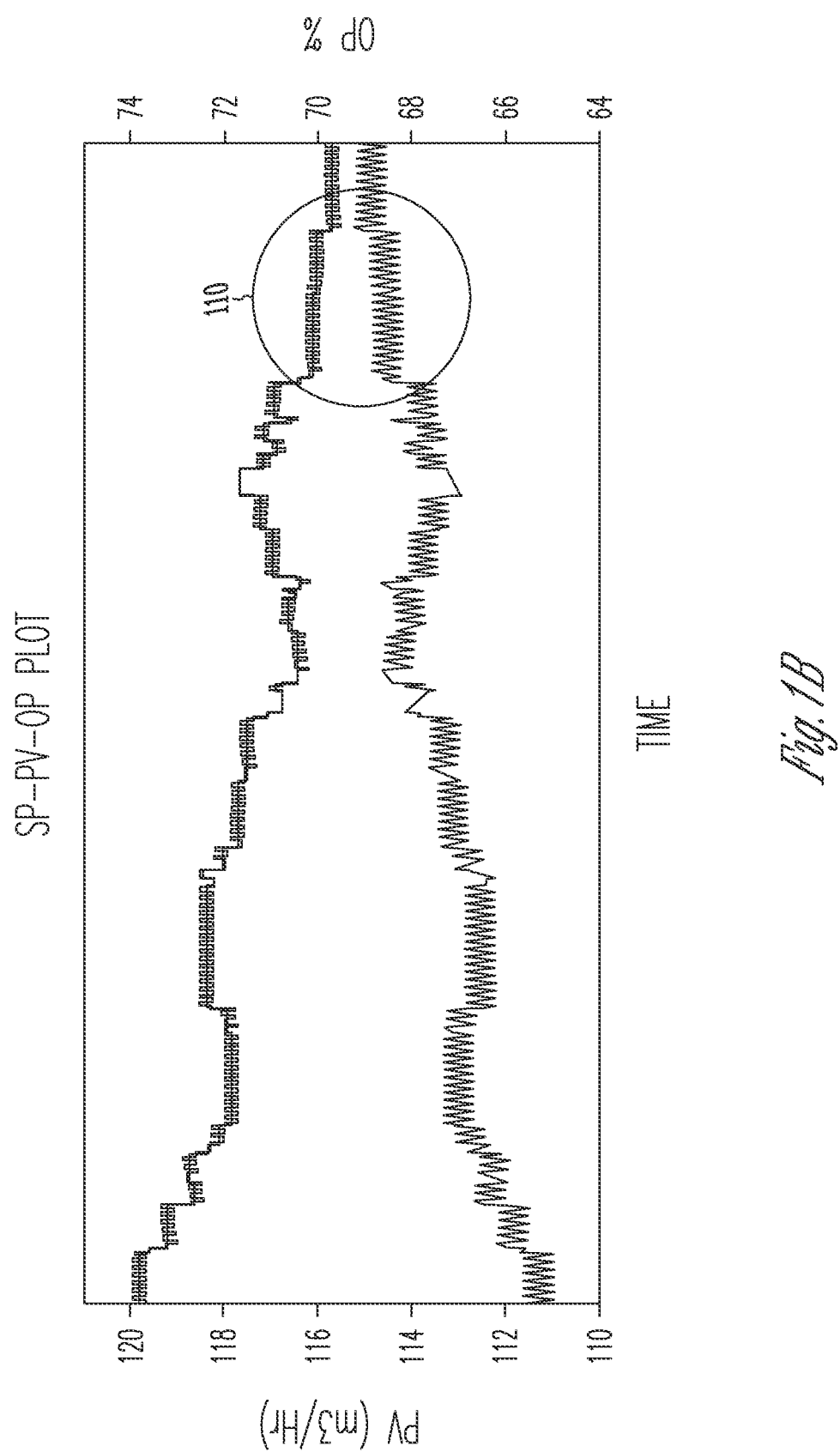

The basis for stiction detection techniques is the qualitative illustration of the phenomenon of stiction, and how closed-loop variables change with stiction and process parameters. Due to the integral action of a controller in an industrial process, valve stiction and other nonlinearities leave distinct shapes in PV, SP, and OP data. The oscillating shapes can be generally categorized as square, triangular, saw-tooth or sinusoidal. When oscillations are not caused by stiction, the shapes of OP and PV are more sinusoidal in nature. For a typical flow control loop with stiction, the OP shows a perfectly triangular wave whereas the PV shows a square wave. Typical stiction patterns for a flow control loop are shown in FIG. 1B.

The machine learning algorithm in an embodiment can be tested on simulated as well as industrial control loop data. When using industrial control loop data, the machine learning algorithm uses a data signal directly on time series data; that is, the algorithm does not work on shape-based data (such as triangles and trapezoids like a CNN does in image processing). The time series data, when given to a trained control engineer, are labeled using visual inspection of trends without any feature extraction. Consequently, the algorithm does not require the actual creation of a PV-SP-OP plot. In contrast, prior systems that use a feature-based CNN in all likelihood need preprocessing of data. Such feature-based use also requires a PV-SP-OP plot or some other plot like a PV-OP biplot to identify shapes like elliptical, butterfly, or other shapes to confirm the presence of an abnormality. However, in the embodiments of this disclosures, there is no need for preprocessing of the data, and the direct PV-SP-OP data, not the plot, from a plant or other facility are used.

It is noted that stiction in a control valve can be detected physically through means such as a valve travel test and/or a bump test, However, these methods are practically impossible as there are thousands of control valves in a typical plant and these tests disturb the plant process. Additionally, such prior methods can take hours to perform. An embodiment is therefore a significantly faster method to detect valve stiction. Once a CNN or other machine learning algorithm is trained, an input tensor comprising the whole batch (I.e., all loops in a facility) or mini-batch (i.e., only some loops in a facility because of memory limitations) can be processed simultaneously in a shorter amount of time (e.g., within minutes). And in contrast to the valve travel test and the bump test, the trained machine learning algorithm is a non-invasive and automated approach to detect valve stiction and other plant abnormalities.

In addition to the training of and the learning by the algorithm based on the intelligence and knowledge of control engineers, an embodiment can integrate feedback from the control engineers by being deployed in a distributed computing environment, such as in the cloud. In a cloud-based embodiment, the CNN or other machine learning algorithm can be trained to the same level as a group of trained control engineers, and the performance of the CNN can be improved by retraining based on feedback from the control engineers via the cloud. An embodiment is also significantly more robust at detecting valve stiction and other abnormalities. As explained in more detail herein, training data are labeled by trained control engineers. This permits an embodiment to reach the same level of accuracy as control engineers. Indeed, with continued training and machine learning, the system can at times better the accuracy of control engineers. This robustness of detection permits the system to better deal with such issues as excessive sensor measurement noise, and it helps the system to avoid being fooled by such noise. Also, the robustness permits an embodiment to perform well in the presence of poor controller tuning and excessive sensor measurement noise. Furthermore, this embodiment can distinguish between oscillation caused by stiction, poor controller tuning, and excessive sensor measurement noise. The embodiment is able to differentiate between valve stiction and other abnormalities, to perform well notwithstanding poor controller tuning and excessive measurement noise, and to distinguish between different causes of oscillation, by properly labeling training data relating to such issues and training the algorithm based on that, properly labeled data. The final output layer of the CNN can therefore perform multi-classifications to determine whether an oscillation in a facility control loop is due to a valve stiction, a component tuning problem, process noise, or measurement noise, if training data had been labelled appropriately.

There are several benefits to embodiments of the present disclosure. First, the same network can be applied to detect oscillation and tuning issues in control loops, as long as the industrial processes are similar in structure. Second, vectorization can he used to process thousands of loops in a very short time, for example in a matter of seconds. Third, as just noted, the final output layer of the CNN can perform multi-classifications. Fourth, various embodiments are unit agnostic, that is, they only require process values (PV), set points), and outputs (OP).

In developing the embodiments disclosed herein, several development challenges were overcome. A first development challenge dealt with data augmentation. CNNs are used mostly to process image data, in which methods to augment the data are well established. In an embodiment however, the CNNs are used for time series data in which the methods to augment data turned out to be more complex. Specifically, data augmentation in control loop PV/SP/OP data is not as easy as in images. For example, every "zig" in PV or SP data should correspond to a commensurate "zag" in OP, because the system needs to follow the physics and chemistry rules governing the system. This correspondence had to be addressed by the inventors to verify the proper functioning of the system.

Another development challenge faced by the inventors related to the fact that different control loop types have different signatures. While in fast loops (i.e., fast flows of ingredients and/or products) it is possible for control engineers to visually classify a stiction problem, in loops with significant delay, dynamic loops, and/or integrated loops, it is not always possible to visually classify the stiction. To overcome this problem, the inventors created simulated data to supplement real data, and then the inventors trained the network with the real data augmented with simulated data. The resulting trained model could then be used to process and interpret current, real production data.

After overcoming these obstacles, the following high-level embodiment vas developed. Data representing a normal operation of a facility and data representing one or more abnormalities of the facility are gathered. These data can be referred to as labeled or annotated data. For example, in an industrial facility, data that are related to a valve stiction can be labeled as such and as an abnormality. Using the labeled data, a machine learning algorithm is trained. As noted above, the machine learning algorithm can be a convolutional neural network (CNN), and in a particular embodiment, the CNN can be a CNN with 3-4 convolution layers followed by 3-4 fully connected layers. After the CNN is initially trained with the labeled data, the hyper parameters of the CNN are tuned and the CNN is evaluated. The CNN is then re-tuned if necessary.

As noted above, the machine learning algorithm is trained using both real and simulated data, and then the resulting model is used to process and interpret real production data. More specifically, in an embodiment, an overall procedure for utilizing a machine learning algorithm such as a CNN to classify an industrial plant abnormality such as a valve stiction is now discussed in detail. Process variable (PV), set point (SP), and controller output (OP) signals are selected for a particular number of simulated valve flow control loops. For example, 3,000 simulated flow loops could be selected. Further, a certain number of samples in each time series control loop is selected, for example, 2,000 samples. The data are classified/labeled for each loop as representing valve stiction data or representing valve data without valve stiction.

In this particular example, a 2,000 by 3,000 vector is then created using these valve stiction-classified control loop data, and the vector is used to train a one-dimensional CNN. The data are divided into a training set to first train the CNN, and a testing set to then test the trained CNN. The split between the training set and the testing set can be a ratio of 90:10. Thereafter, the CNN is trained using five convolutional layers, four fully connected layers, and a Rectified Linear Unit (ReLU) activation function. After the training phase is completed, the test data set is provided to the trained CNN to determine if the trained CNN can properly identify and predict valve stiction. Control engineers are normally the ones who interpret the output and results of the CNN processing of the test data.

After the CNN is trained, tested, and adjusted, the trained CNN can be used on production data of an industrial plant or other facility. First, a particular number of PV, SP, and OP signals are selected from real plant flow control loops. In an embodiment, the number of selected signals can be about 10,000, and the number of samples in each time series control loop data can be about 5,000. The trained CNN can then classify each loop using the production data, that is, whether stiction is present or stiction is not present. Thereafter, the CNN can be retrained with the real plant data, which entails further interpretation of the results and retuning of the CNN.

In a further embodiment, the real plant data can be augmented by using a certain number of contiguous samples after every certain number of samples for each loop. For example, using 2,000 contiguous samples after every 100 samples for each loop. Thereafter, the CNN can be retrained and retuned, the real plant data can be data balanced to make the number of valve sticky loops and valve non-sticky loop approximately equal in number, and the CNN can then be retrained and retuned for a final time.

The above-described process of selecting, training, and retraining is illustrated in graphic form in FIGS. 3, 4A, and 4B. FIGS. 3, 4A, and 4B are block diagrams illustrating operations and features of systems and methods to train a machine learning algorithm to identify abnormalities in a facility control loop. FIGS. 3, 4A, and 4B include a number of blocks 310 329 and 410-472 respectively. Though arranged substantially serially in the examples of FIGS. 3, 4A, and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 3, the process can be divided into a development phase 310 and a deployment phase 320. The deployment phase further consists of an online phase 321 and an offline phase 328. At 311, annotated/labeled loop data are received from simulated data and sample plant data. As noted, these data in a valve stiction example can represent PV, SP, and OP data. At 312, the received data are augmented. This data augmentation can include data. resampling and data cropping. The data are placed into a vector format. At 313, the vectorized data are used to train a one-dimensional CNN with five convolutional layers, four fully connected layers, and an ReLU activation layer. Operation 313 results in a trained CNN or model 314.

The trained model 314 is provided to the deployment phase 320 beginning at the model execution 322. The trained model 314 is provided with real time production loop data at 323. As noted, these production data can include PV, SP, and OP data. The model execution 322 generates a decision on whether the control loop at issue is experiencing valve stiction or not at 324. At 325, control engineers can provide feedback as to the accuracy and correctness of the valve stiction/non-stiction by the trained CNN, the model can be updated at 329 based on that feedback, and the updated model can be used at the model execution 322.

FIGS. 4A and 4B illustrate another embodiment to train a machine learning algorithm to identify abnormalities in a facility control loop. In the more particular embodiment of FIGS. 4A and 4B, machine learning and a CNN are used directly on time series data (not a shaped-based machine learning of features) to learn the operation of an industrial process control loop system, and to identify and react to abnormalities in the industrial process control loop system. Referring now specifically to FIGS. 4A and 4B, at 410, time series production data are accessed by a computer system. These time series production data represent a control process in a control loop of a facility. Facilities can include industrial plants such as refineries, manufacturing plants, pulp paper plants, and steel mills, and can further include buildings such as offices, museums, theatres, and schools. Control loops can refer to, for example, a mixing loop in an industrial facility or a heating, ventilation, and air conditioning (HVAC) loop in an office building. These time series production data can include process variables, set points, and controller outputs. At 415, the time series production data are placed into a vector.

At 420, the time series production data are processed using a trained machine-learning algorithm. When the time series production data are added to a vector, the vector is processed using the trained machine-learning algorithm. The trained machine-learning algorithm is trained using positive training data that are representative of a normal operation of components within the facility control :loop and negative training data that are representative of an abnormal operation of components within the facility control loop. The positive (raining data can include for example data relating to process values (PVs), set points (SPs), and controller outputs (OPs), and can indicate the absence of valve stiction, oscillating loops, under-performing loops, over-performing loops, data spikes, and frozen data. The negative training data can include the presence of valve stiction, oscillating loops, under--performing loops, over-performing loops, data spikes, and frozen data. An example of a component that is analyzed is a control valve. In an embodiment, the positive and negative training data are labeled data representative of operation of the components within the facility control loops. The multiclass labels are deemed positive or negative depending on absence or presence of combination of the underlying issues (e.g., valve stiction, oscillating loops, under-performing loops, over-performing :loops, data spikes, and frozen data).

The positive training data and the negative training data can furthermore be subjected to data balancing and data augmentation. Data balancing refers to structuring the positive training data and the negative (raining data so that the data are approximately equal in amount. For example, there should be approximately both 1 meg of positive training data and 1 meg of negative training data. In an embodiment, data augmentation increases the size and diversity of data that are used for training the machine learning algorithm without actually collecting new data. Data augmentation can be done by up sampling, down sampling, windowing, and using simulated data. In windowing, a constant window of data is taken with different starting samples to increase the size of the data. In up sampling, the sample time is decreased using interpolation, and in down sampling, the sample time is increased by keeping every $n^{th}$ sample. The trained machine learning algorithm can therefore handle multiple sampling periods, whether the sample periods are one second, two seconds, five seconds, or longer in duration.

At 430, one or more abnormalities are identified in the facility control loop based on the output of the trained machine-learning algorithm. These abnormalities can include valve non-linearities, and as indicated above, can include valve stiction, oscillating loops, under-performing loops, over-performing loops, data spikes, and frozen data. The trained machine learning algorithm can classify several different abnormalities based on the time series production data. This can be referred to as a multi-classification. For example, the trained machine learning algorithm can classify, using a particular set of labeled time series production data, one or more of a component failure, a component tuning issue, noise from the facility control loop, and/or noise from the measuring components (e.g., temperature sensor) in the facility control loop. As indicated at 435, the one or more abnormalities can be identified using the output of the trained machine learning algorithm on the processed vector. This embodiment can, among other things, increase the processing speed of the system. At 440, a signal is transmitted to a computer display device indicating the one or more abnormalities. The computer display device can be a terminal in a control room and/or mobile device of a controller engineer, for example. As indicated at 440A, the transmitted signal can suggest or indicate one or more actions to be taken by the control engineer to address the abnormalities. For example, the suggestion can include adjusting a particular process of the facility, adjusting one or more valves, adjusting one or more temperatures, and/or adjusting one or more pressures.

As noted at 421, the trained machine-learning algorithm can be a convolutional neural network (CNN). Many variations of a CNN could be used. In an embodiment however, the CNN can include three or four convolution layers and three or four fully connected layers. In another embodiment, the CNN can be a one-dimensional CNN that includes five convolutional layers, and the five convolutional layers can include four fully connected layers and a Rectified Linear Unit (ReLU) activation function.

At 422, the trained machine learning algorithm can determine that an oscillating control loop is due to an external factor. An external factor is something that is outside of the settings and functioning of the components of the facility control loop. For example, an external factor could be that a particular piece of equipment is completely out of service. Of course, the trained machine learning algorithm, as explained above, can determine that an oscillating control loop is due to an internal factor, such as valve stiction.

At 431, the trained machine learning algorithm identifies data spikes in the time series production data. An example of a data spike is a temperature that is out of an acceptable set point range. At 431A, the trained machine learning algorithm further identifies the location of the data spike in the time series production data. The identification of the presence and location of data spikes can be accomplished, when training the machine learning algorithm, by labeling the historical time series data for the presence or absence of data spikes and the location of the data spikes.

In an embodiment, as indicated at 450, the processing of the time series production data and the identifying of the abnormalities in the time series production data by the trained machine learning algorithm is executed in a distributed system of computer resources, such as in the cloud. When executed in the cloud, as indicated at 451, input can be collected from control engineers regarding the identified abnormalities, and at 452, the trained machine-learning algorithm can be retrained based on the input of the control engineers. For example, the retraining can include tuning the hyperparameters that are associated with the machine learning algorithm and then reevaluating the machine learning algorithm.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a. network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510. The computer system 500 may additionally include a storage device 516 (e.g., drive unit), a signal generation device 518 (e.g., a speaker), a network interface device 520, and one or more sensors 528, such as a global positioning system sensor, compass, accelerometer, or other sensor.

The drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 524 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
   accessing, by a computer processor, a set of time series production data representative of a control process within a facility control loop comprising at least one control valve;
   processing, by computer processor, the set of time series production data using a trained machine-learning algorithm, the trained machine-learning algorithm trained using a training data set comprising positive training data representative of a normal operation of one or more control valves within the facility control loop and negative training data representative of an abnormal operation of one or more control valves within the facility control loop, wherein the training data set comprises actual training data augmented based at least in part on an augmented training data set;
   identifying, by the computer processor, one or more abnormalities associated with the at least one control valve in the facility control loop based on output of the trained machine-learning algorithm, wherein the one or more abnormalities associated with the at least one control valve in the facility control loop are indicative of at least a control valve nonlinearity-based abnormality; and
   transmitting, by the computer processor, a signal to a computer display device indicating the one or more abnormalities.

2. The process of claim 1, further comprising: in accordance with the identification of the one or more abnormalities, transmitting to the computer display device a signal indicating one or more actions for addressing the one or more abnormalities.

3. The process of claim 1, wherein the trained machine-learning algorithm comprises a convolutional neural network (CNN).

4. The process of claim 1, further comprising: identifying, by computer processor, based on the output of the trained machine-learning algorithm, a data spike in the set of time series production data and a location of the data spike in the set of time series production data.

5. The process of claim 1, further comprising: identifying, by the computer processor, based on the output of the trained machine-learning algorithm, an oscillating control loop due to external factors.

6. The process of claim 1, comprising processing, by the computer processor, the set of time series production data, the processing identifying the one or more abnormalities in a system of distributed computer resources; collecting input identifying the one or more abnormalities; and retraining the trained machine-learning algorithm based on the input.

7. The process of claim 1, further comprising: performing, by the computer processor, based on the output of the trained machine-learning algorithm, a classification of the set of time series production data, a multiclassification of the set of time series production data identifying whether the one or more abnormalities comprise one or more of a component failure, a component tuning issue, process noise, or measurement noise.

8. The process of claim 1, further comprising: placing, by the computer processor, the set of time series production data into a vector; processing the vector using the trained machine-learning algorithm; and identifying the one or more abnormalities using the processed vector.

9. The process of claim 1, wherein the training data set comprises the training data set augmented based at least in part on a simulated data set utilized for training.

10. The process of claim 1, wherein the augmented training data set comprises data augmented utilizing (i) upsampling of the actual training data, (ii) downsampling of the actual training data, or (iii) a combination of upsampling and downsampling of the actual training data.

11. The process of claim 1, wherein the positive training data comprises at least one simulated data portion labelled by a user as representative of the normal operation and the negative training data comprises at least one simulated data portion labelled by a user as representative of the abnormal operation.

12. The process of claim 1, wherein the positive training data includes a first number of data portions and the negative training data includes a second number of data portions, the first number of data portions and the second data portions determined within a threshold defining approximate equivalence.

13. The process of claim 1, wherein the control valve nonlinearity-based abnormality comprises a control valve stiction abnormality.

14. A device comprising:
one or more processors;
memory; and
one or more programs stored in memory, the one or more programs including instructions for performing a process comprising:
accessing, by a computer processor, a set of time series production data representative of a control process within a facility control loop comprising at least one control valve;
processing, by the computer processor, the set of time series production data using a trained machine-learning algorithm, the trained machine-learning algorithm trained using a training data set comprising positive training data representative of a normal operation of one or more control valves within the facility control loop and negative training data representative of an abnormal operation of one or more control valves within the facility control loop, wherein the training data set comprises actual training data augmented based at least in part on an augmented training data set;
identifying, by the computer processor, one or more abnormalities associated with the at least one control valve in the facility control loop based on output of the trained machine-learning algorithm, wherein the one or more abnormalities associated with the at least one control valve in the facility control loop is indicative of at least a control valve nonlinearity-based abnormality; and
transmitting, by the computer processor, a signal to a computer display device indicating the one or more abnormalities associated with the at least one control valve in the facility control loop.

15. The device of claim 14, further comprising: in accordance with the identification of the one or more abnormalities, transmitting to the computer display device a signal indicating or more actions for addressing the one or more abnormalities.

16. The device of claim 14, further comprising: identifying, by the computer processor, based on the output of the trained machine-learning algorithm, an oscillating, control loop due to external factors.

17. The device of claim 14, further comprising: processing, by the computer processor, the set of time series production data, the processing identifying the one or more abnormalities in a system of distributed computer resources; collecting input identifying the one or more abnormalities; and retraining the trained machine-learning algorithm based on the input.

18. The device of claim 14, further comprising: performing, by the computer processor, based on the output of the trained machine-learning algorithm, a classification of the set of time series production data, a multiclassification of the set of time series production data identifying whether the one or more abnormalities comprise one or more of a component failure, a component tuning issue, process noise, or measurement noise.

19. The device of claim 14, further comprising: placing, by the computer processor, the set of time series production data into a vector; processing the vector using the trained machine-learning algorithm; and identifying the one or more abnormalities using the processed vector.

20. A non-transitory computer-readable storage medium comprising one or more programs for execution by one or more processors of a device, the one or more programs including instructions which, when executed by the one or more processors, cause the device to perform a process of:
accessing, by a computer processor, a set of time series production data representative of a control process within a facility control loop comprising at least one control valve;
processing, by the computer processor, the set of time series production data using a trained machine-learning algorithm, the trained machine-learning algorithm trained using a training data set comprising positive training data representative of a normal operation of one or more control valves within the facility control loop and negative training data representative of an abnormal operation of one or more control valves within the facility control loop, wherein the training data set comprises actual training data augmented based at least in part on an augmented training data set;
identifying, by the computer processor, one or more abnormalities associated with the at least one control valve in the facility control loop based on output of the trained machine-learning algorithm, wherein the one or more abnormalities associated with the at least one control valve in the facility control loop is indicative of at least a control valve nonlinearity-based abnormality; and
transmitting, by the computer processor, a signal to a computer display device indicating the one or more abnormalities associated with the at least one control valve in the facility control loop.

\* \* \* \* \*